United States Patent
Feldman

[15] 3,678,765
[45] July 25, 1972

[54] MAGNETICALLY-TUNED RESONANT GYROSCOPE

[72] Inventor: Irwin M. Feldman, Plainview, N.Y.

[73] Assignee: Ambac Industries, Incorporated, Garden City, N.Y.

[22] Filed: Dec. 15, 1969

[21] Appl. No.: 884,807

[52] U.S. Cl. ............................... 74/5.46, 74/5
[51] Int. Cl. ............................... G01c 19/24
[58] Field of Search .......... 74/5, 5.5, 5.46, 5.47, 5.7

[56] References Cited

UNITED STATES PATENTS

| | | |
|---|---|---|
| 3,301,073 | 1/1967 | Howe ............................... 74/5.7 |
| 3,534,616 | 10/1970 | O'Connor ............................... 74/5 |
| 3,264,880 | 8/1966 | Fischel ............................... 74/5 |
| 3,382,726 | 5/1968 | Erdley ............................... 74/5 X |
| 3,452,608 | 7/1969 | Stiles ............................... 74/5 |
| 3,483,760 | 12/1969 | Hurlburt ............................... 74/5 |
| 3,529,477 | 9/1970 | Quermann ............................... 74/5 |
| 3,543,301 | 11/1970 | Barnett ............................... 74/5 |

*Primary Examiner*—Manuel A. Antonakas
*Attorney*—Howson and Howson

[57] ABSTRACT

A "tuned" gyroscope having spring restraints, which is tuned to resonance by a restoring torque produced by hysteresis motor windings which also spin the gyro rotor.

8 Claims, 5 Drawing Figures

Patented July 25, 1972

INVENTOR:
IRWIN M. FELDMAN
BY
Howson & Howson
ATTYS.

MAGNETICALLY-TUNED RESONANT GYROSCOPE

BACKGROUND OF THE INVENTION

Gyroscopes are now known in which the rotor is supported on a rotating support by means of a universal joint comprising an intermediate support means upon which the rotor is mounted and which is in turn mounted on a rotating support, the connection between intermediate support means and rotor providing spring restraint about one gimbal axis at right angles to the spin axis of the rotor, and the connection between the intermediate support means and the rotating support providing spring restraint about another gimbal axis at right angles to the spin axis and to the first gimbal axis. In such gyroscopes it has been found that the spring restraint about the gimbal axes can be exactly balanced by the inertia effects of the intermediate support means to produce an effective resonance condition in which the precessional drift rate is extremely small, and theoretically substantially zero. Such a gyroscope is, for example, described and claimed in U.S. Pat. No. 3,301,073 of Edwin H. Howe, filed June 28, 1963 and issued Jan. 31, 1967. In such gyroscopes it is common to spin the rotor by means of a motor which drives the rotor through a universal joint. Tuning of the gyroscope is effected, first, by selection of an appropriate moment of inertia for the intermediate support means and of an appropriate spring constant for the spring-restraining devices, in view of the rotor spin frequency to be employed. Secondly, to achieve more exact tuning, the moment of inertia of the intermediate support means may be adjusted by addition of small weights or by variation in the positions of tuning masses on the intermediate support means. While it is also possible to achieve tuning by variation of the rotor spin frequency, ordinarily the spin frequency is fixed and regulated to a constant value appropriate for the particular installation and application, so that this is often not convenient or possible to use as a tuning mechanism.

Accordingly it is an object of the invention to provide a new and useful gyroscope system.

Another object is to provide a new and useful method of tuning a gyroscope.

A further object is to provide a new and useful apparatus for driving a tunable gyroscope.

A still further object is to provide a new and useful method and apparatus for driving a tunable gyroscope and for providing fine-tuning thereof.

Another object is to provide the latter type of method and apparatus which does not require mechanical adjustment of the physical elements of the gyro, nor change in the frequency of AC drive signals for the spin motor winding.

SUMMARY OF THE INVENTION

These and other objects of the invention are achieved by the provision of a gyroscope system of the above-described type utilizing a rotating suspension including an intermediate support means which when rotated exerts an inertial negative spring effect on the rotor, in which an additional positive spring-like restraint is applied to the rotor by an electrically-produced field acting on the rotor in the direction to tend to restore the spin axis of the rotor to a reference position. The strength of this restoring torque for any given angle of deviation of the spin axis is dependent upon the strength of the field, and means are provided for controllably varying this electric current thereby to permit adjustment of the strength of the positive spring-like restoring torque exerted on the rotor. The total restoring torque acting on the rotor is then the sum of that due to the electrically-controlled field acting thereon plus all other spring-like restraints, normally consisting of the spring restraint provided by spring elements in the universal joint on which the rotor is supported. Controlled variation of the applied field thereby enables fine-tuning of the gyro so as to obtain the desired precessional drift rate, which is normally the minimum precessional drift rate.

In its preferred form the invention comprises a spring-restrained tuned gyro driven by a hysteresis motor made up of a hysteresis armature on the rotor and a stator winding cooperating with the hysteresis armature to produce torque around the spin axis of the gyro rotor, the hysteresis armature and the stator winding being so positioned as to apply substantially zero torque to the rotor about its gimbal axes when the rotor spin axis is in its reference position for which the restraining torque exerted by the springs in the universal joint is zero. Accordingly, when the spin axis of the rotor is in its reference position the hysteresis motor produces a torque substantially only around the spin axis to produce the desired spinning; however, when the spin axis is offset from its reference position with respect to the stator, the motor field produces a restraining torque which is additive to the restraining torque exerted by the spring elements associated with the rotor support. To provide a gyroscope system in which the precessional drift rate is minimum, the spring restraints produced by the spring elements associated with the rotor support are selected to be slightly less than that required for minimum precessional drift, the spring-like restraint due to the hysteresis motor then providing the remaining restraint required for minimum precessional drift. To permit fine electrical tuning, the system is preferably designed to produce minimum precessional drift rate when the motor-current control is near the center of its range of adjustment; when the system is assembled and placed into operation, the current control can then be adjusted in one direction or the other from its central position to achieve exactly the desired final tuning.

BRIEF DESCRIPTION OF THE DRAWINGS

These and other objects and features of the invention will be more readily understood from a consideration of the following detailed description, taken in connection with the accompanying drawings, in which:

FIG. 4 is a sectional view taken along lines 4—4 of FIG. 2, showing in more detail a preferred arrangement of stator laminations and motor windings which may be used in the system of the invention, with certain elements omitted for clarity; and FIG. 5 is a schematic diagram illustrating in more detail one preferred simple form for the electrical circuitry of the invention.

DESCRIPTION OF PREFERRED EMBODIMENTS

Figure 1:
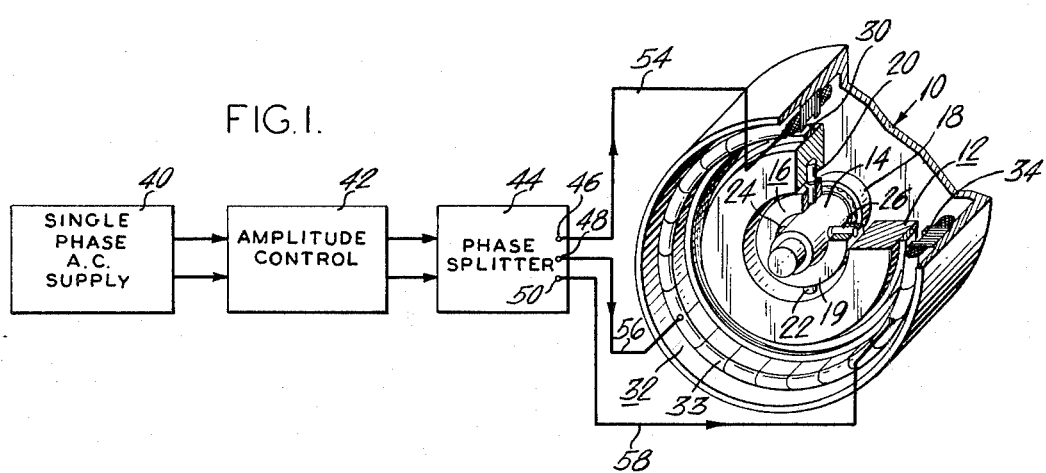
FIG. 1 is a schematic diagram illustrating one preferred embodiment of the invention.

Considering now by way of example only the specific embodiments of the invention shown in detail in the drawings, FIG. 1 shows a two-axis spring-restrained gyro 10 of the general type described and claimed in the above-identified Howe patent, except that while the latter patent specifically shows spinning of the gyroscope rotor by means of a spin motor directly driving the gyroscope support shaft, in accordance with the present embodiment of the invention the rotor is spun by hysteresis-motor rim-drive of the rotor itself.

More specifically, in the arrangement of FIG. 1 the gyroscope rotor 12 is mounted on support means in the form of support shaft 14, by means of the two-axis spring-restrained rotating suspension 16. Shaft 14 is journaled in a suitable bearing 18 secured to the supporting frame (not shown). As will be described in more detail in connection with FIGS. 2 and 3, the suspension 16 in this example comprises a ring-shaped intermediate member 19 upon which rotor 12 is supported by means of a pair of torsionally-resilient connectors 20 and 22 which permit spring-restrained tilting of the gyro rotor about a first axis through the connectors 20 and 22. Intermediate member 19 is in turn mounted upon support shaft 14 by means of a pair of connectors 24 and 26 similar to connectors 20 and 22 but extending at right angles thereto and permitting at least limited pivoting of intermediate member 19 with respect to support shaft 14 about an axis extending through connectors 24 and 26. The two pivot, or gimbal, axes provided by the two pairs of connectors are at right angles to each other and to the spin axis of the rotor 12. As is described in the above-identified Howe patent, there is a particular spin rate for rotor 12 at which the effects of the inertia of the intermediate member 19 substantially exactly cancel the effects of the spring restraints produced by the two pairs of connectors insofar as their effects in producing precessional drift of rotor 12 are concerned. This condition is designated as the effective resonance condition of the gyroscope.

In this example, spinning of the rotor is accomplished by means of the hysteresis ring 30 secured to the center of the outer periphery of the rotor 12, acting together with the stator winding assembly 32. The stator winding assembly 32 typically comprises generally annular poly-phase windings 33 on a laminated stator core 34 of the type usual in hysteresis motors, and in fact such hysteresis motor drive arrangements are known for use in other types of gyroscopes and need not be described in detail. In this example the stator windings are assumed to be of the three-phase Y-connected type and coaxial with the support shaft 14.

To produce appropriate alternating current in windings 33 for operating the hysteresis motor to spin the rotor 12, there is provided a single-phase AC supply 40, which may for example be a 400-cycle 24-volt supply. The alternating voltage from supply 40 is passed through an amplitude control 42 to a phase splitter 44, which may be of conventional form to produce at its output terminals 46, 48 and 50 three separate alternating voltages differing from each other in phase by 120 degrees. The three differently-phased voltages are supplied over leads 54, 56 and 58 respectively, to the appropriate connection points on the hysteresis motor windings 33. The result is to produce a rotating magnetic field acting on the hysteresis armature ring 30 to cause it and the rotor 12 attached thereto to spin about the axis of the generally-annular motor windings 33. In this way the rotor is caused to rotate synchronously with the frequency of the AC supply, the rate of spinning of the rotor 12 being substantially independent of the magnitude of the motor winding current over a substantial range of such currents.

When the spin axis of the rotor 12 and the axis of the motor windings 33 are coaxial with each other, the torque exerted by the hysteresis motor on rotor 12 is exerted substantially entirely about the rotor spin axis, and there is no torque about axes at right angles to the spin axis. However, when the spin axis of the rotor 12 departs or deviates slightly from its reference position along the axis of windings 33 (in which reference position the spring restraint provided by the connectors 20, 22, 24 and 26 is substantially zero), the torque exerted by the hysteresis motor on rotor 12 has a component about an axis at right angles to the spin axis, this torque being in a direction to urge the rotor back toward its reference position. At least for small angles of departure of the spin axis from its reference position and for a fixed amplitude of current in windings 33, this restoring torque increases from zero with increasing departure of the spin axis from its reference position; accordingly, it acts like a physical spring tending to urge the rotor toward its reference angular position. This effect is additive to the spring restraint provided by the connectors 20, 22, 24 and 26, and, if the physical elements of the gyroscope were designed without taking into account this motor-induced restoring torque, the gyroscope would be detuned from its effective resonance condition. However, in accordance with the invention the spring restraint provided by the connectors 20, 22, 24 and 26 is made less than that required to produce effective resonance by an amount equivalent to the effective spring restraint provided by the hysteresis motor, thereby providing operation in the effective resonance condition despite the torquing effects of the hysteresis motor. In addition, the amplitude control 42 permits control of the amplitude of the motor winding currents to control the effective spring rate of the hysteresis motor, the larger the current the greater the spring rate.

It will be appreciated that it is difficult and inconvenient so to construct the gyroscope system initially, and so to maintain all of its operating parameters during use, that it will operate exactly at the desired resonance point without providing for some fine adjustment of the parameters thereof. While in the past resort has been had to various mechanical expedients to provide such a fine-tuning capability, these in themselves introduce a certain amount of unnecessary complexity in design and operating procedure. The amplitude control 42 provides convenient electrical tuning of the gyroscope in an effective and simple manner, not requiring adjustment of the physical elements of the gyroscope nor control of the frequency of the AC source. While amplitude control 42 may be manually variable, it is also susceptable to embodiment in forms in which it is electronically variable for automatic control purposes, for example.

One preferred embodiment of a gyroscope construction suitable for use in the system of FIG. 1 is illustrated in FIGS. 2–5, parts of the gyroscope shown in FIGS. 2–5 which correspond to parts of the gyroscope represented schematically in FIG. 1 being indicated by corresponding numerals followed by the suffix A. A suitable supporting frame 60 supports the cylindrical outer casing 62 on which in turn are mounted the gyroscope elements and the hysteresis motor elements. Thus rotatable support shaft 14A is journaled in the double ball-bearing arrangement 18A secured to a support structure 63 forming part of the front (right-hand in FIG. 2) closure for gyroscope casing 62 and to threaded rear closure plate 64, thereby to permit rapid rotation of support shaft 14A about the cylinder axis of casing 62. The gyro rotor 12A comprises a relatively massive annular ring supported on shaft 14A for rotation therewith by means of the rotating suspension. This suspension comprises an intermediate ring 19A less massive than rotor 12A disposed interior thereof and concentric with shaft 14A, the mounting of rotor 12A on intermediate member 19A being accomplished by the flexure pivots 20A and 22A, which may be like those shown in detail in the above-mentioned Howe patent. Similar flexure pivots may be used for the connectors 24A and 26A which mount intermediate member 19A on support shaft 14A. Casing 62 may provide hermetic encasement, and the interior thereof may be evacuated and sealed-off by sealoff tip 66.

The laminated core 34A of the stator arrangement 32A comprises an assembly of stacked, generally-circular, stator plates such as 72 mounted on the interior of casing 62 coaxially with the axis of support shaft 14A so that, when the rotor 12A is in its reference position as shown, the stator core is aligned with, and balanced with respect to, the hysteresis ring armature 30A secured to the center of the outer periphery of the rotor 12A. The stator windings 33A are disposed in and between the stator-core slots to provide a polyphase hysteresis motor winding arrangement. The stator assembly is held in place by a shoulder 73 on casing 62, against which it is pressed by clamp ring 74 when rear closure plate 64 is screwed in tightly. The materials and disposition of the stator core and of the hysteresis ring, as well as the nature and arrangement of the polyphase windings, may all be selected in accordance with known practice in the art of hysteresis motors. Typically the stator core material is a so-called "soft" magnetic material, while the hysteresis ring is of a so-called "hard" material to provide the desired hysteresis effect. The polyphase winding in this example may be provided with three separate terminals, these three separate terminals being supplied with voltages which differ from each other in phase by 120°. Insulated feed-through connectors 77, 78, 79 extending through the front closure of casing 62 provide electrical connection from the exterior of casing 62 to the three stator windings by way of appropriate lead wires (not shown) inside casing 62. Stops 81 limit the angular deviation of the rotor from its reference position.

FIG. 4 illustrates one typical configuration of stator core plates and windings. Each of the plates such as 72 is provided with a plurality (in this case 24) of inwardly-projecting teeth such as 82 forming between them slots such as 83 for receiving the stator windings. The armature plates 72 are all similar and are aligned so that the slots extend axially across the entire width of the core. The winding of the motor is accomplished by means which are apparent to one skilled in the art of hysteresis-synchronous motors and hence need not be described in detail.

It is characteristic of such a motor arrangement that, in addition to providing torque for spinning the rotor, it produces an erecting torque on the hysteresis ring 30A and on the rotor 12A tending to return the rotor spin axis to its reference position in alignment with the motor winding when it has deviated therefrom, at least within certain angular limits of such deviation. Thus when the spin axis of rotor 12A is exactly coaxial and aligned with the center of the stator core 30A, the restoring torque exerted on the rotor is substantially zero; however, when the rotor spin axis deviates from this position, a restoring torque is exerted which increases with increasing deviation. This produces an effect on the rotor 12A which is similar to that which would be produced by a spring restraint urging the rotor into its reference position. Furthermore, the strength of this "restoring" torque increases with the current in the stator windings and hence with increases in the voltage applied to the stator windings. The effective spring rate of the electrical spring provided by the motor arrangement is therefore variable by varying the voltage applied to the windings. Accordingly, not only can the spring-like restraint introduced by the spin motor be compensated for by detuning of the physical elements of the gyro (such as the spring elements in the suspension, the moment of inertia of the intermediate member and the spin rate) but in addition the fine tuning of the entire gyroscope to the desired effective resonance point can be accomplished by variation of the stator winding current and hence by variations of the amplitude control 42 of FIG. 1.

FIG. 5 shows details of one possible form of the system of FIG. 1, particularly with respect to the electrical components thereof. Corresponding parts are again indicated by corresponding numerals, with the suffix A. Thus the alternating current for supplying the stator windings is derived from an amplitude and frequency-regulated single-phase AC supply 40A. The amplitude of this signal may be regulated by any convenient, known electronic device so that the amplitude of the voltages applied to the stator windings will not vary randomly. Similarly, the frequency of the AC supply may be regulated by any well-known electronic means so that the spin rate, and hence the tuning, of the gyroscope will not change uncontrolledly.

The amplitude control 42A in this example comprises a simple potentiometer device 90 made up of resistor elements 92 and 103 and a variable tap 94 on resistor element 92 which is manually positionable by an operator to vary the amplitude of the voltage supplied to the phase splitter 44A. The latter circuit in this example comprises a capacitive element 104, one end of which is connected to variable tap 94 and the other end of which is connected to the terminal 101. The value of the capacitive element is selected so that the voltage output of the capacitive element 104 at terminal 101 has a phase relative to the voltages at tap 94 and at lead 102 that is 120° leading and 120° lagging respectively. This value of the capacitive element can readily be determined analytically or empirically.

The gyro motor windings 98, 99 and 100 are connected in a three-phase Y-connection, and supplied with 120° phase-related voltages from lead 102, terminal 101, and tap 94, respectively.

Figure 2:
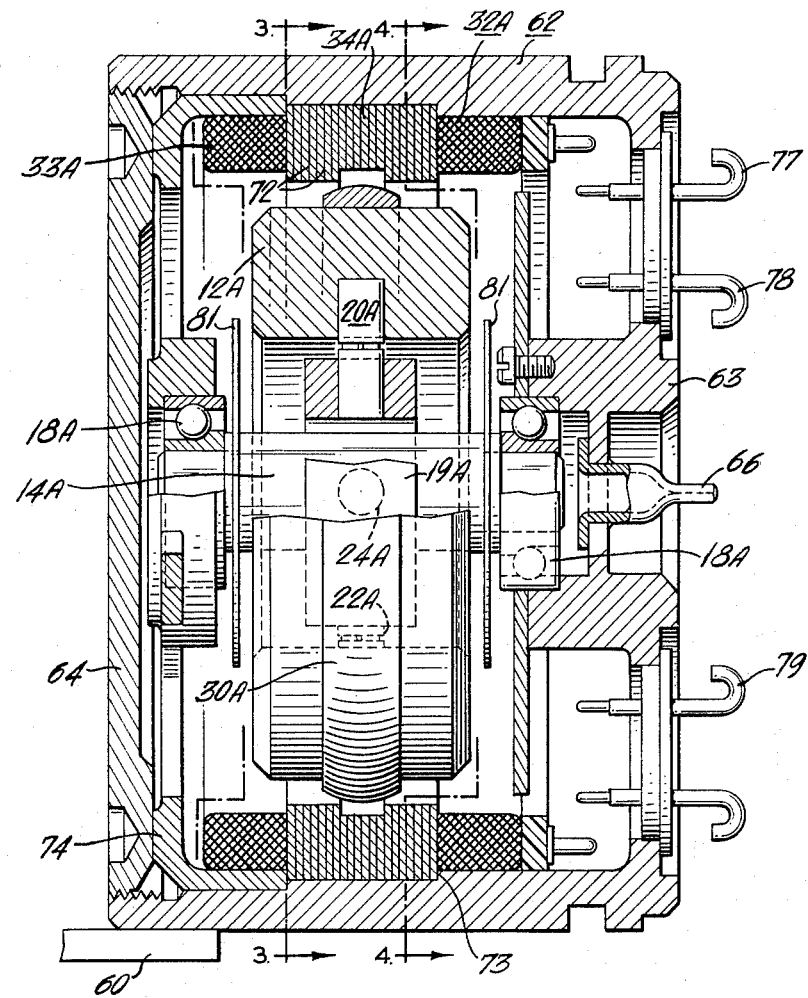
FIG. 2 is a vertical section, with parts shown in full, of a gyroscope of the type preferred for use in the system in FIG. 1.
Figure 3:
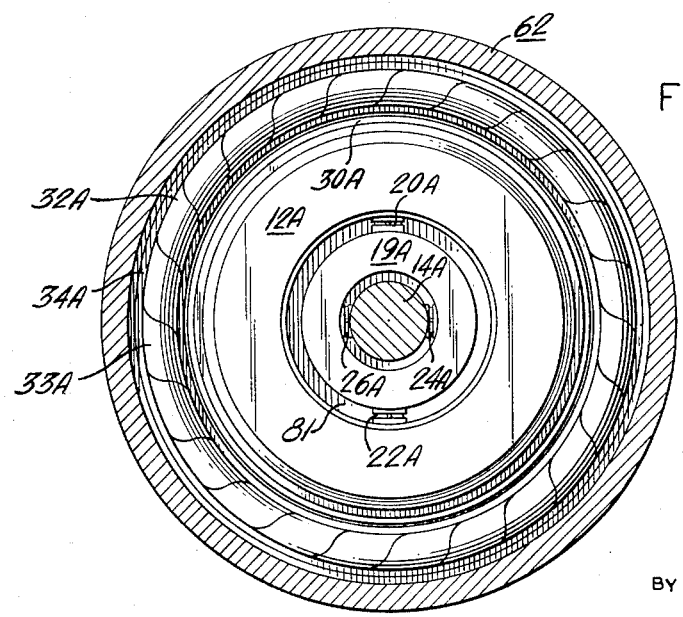
FIG. 3 is a section taken along lines 3—3 of FIG. 2.

To adjust the system shown in FIG. 5, the gyroscope may be constructed and assembled as shown in FIGS. 2 and 3 and the hysteresis motor windings supplied with the desired AC supply voltages as indicated in FIG. 5. The system is preferably designed so that, at the desired operating condition, the tap 94 is near the center of its adjustable range. Accordingly, with the system set up and in operation, the precessional drift rate of the gyro rotor is observed when it is displaced from its reference position and the tap 94 adjusted until this rate is a minimum, at which time the desired condition of effective resonance will have been provided.

Although a manually-variable potentiometer has been shown for the amplitude control in this instance, many other forms of device known in the art for such purposes may be used, and in fact the amplitude control may be electrically controlled by remote apparatus, or even by signals indicative of the precessional drift rate of the rotor so as to provide automatic amplitude control of the signals supplied to the motor winding to tune the gyroscope exactly to its desired effective resonance condition.

To provide signals representative of the angular deviation of the rotor spin axis from its reference direction it is common to employ angle pickoff devices for sensing the angular position of the rotor with respect to its supporting frame about axes normal to the reference axis position; it is also common in some applications to control the spin axis position by means of torquers applying torques about said normal axes. Pickoff devices and torquers have not been shown in the foregoing embodiments since they are not a necessary part of the present invention, but it is understood that they may be incorporated by means which will be apparent to one skilled in the art. For example, photoelectric, optical capacitive or inductive pickoffs may be provided adjacent side surfaces of the rotor, and electromagnetic torquers may also be positioned to act against said side surfaces. Alternatively, pick-off and/or torquer coils may be included in the stator assembly, and may in fact be wound upon the same core on which the hysteresis motor windings are wound, in known manner, and supplied with separate operating signals.

Although in the form of the invention shown in the drawings the electrical fine-tuning is accomplished by control of the strength of alternating current through the hysteresis motor windings, direct or alternating current applied through separate tuning coils may be used. Other suitable forms of apparatus for applying to the rotor a restoring torque of electrically-controllable strength will also occur to one skilled in the art.

Without thereby in any way limiting the scope of the invention, the following example is provided of one specific form which the invention described above may take in one application thereof:

Rotor 12A: Material, Silicon Iron; weight, about 5 oz.; outer radius, about 0.9 in.; inner radius, about 0.5 in.; thickness, about 0.75 in.; moment of inertia about spin axis, about 500 gm. cm.$^2$.

Intermediate member 19A: Material, Silicon Iron; outer radius, about 0.45 in.; inner radius, about 0.25 in.; moment of inertia about spin axis, about 10 gm. cm.$^2$; moment of inertia about axis at right angles to spin axis, about 5 gm. cm.$^2$.

Connectors 20, 22, 24 and 26: Each a crossed lead-spring flexure pivot of the type shown in the above-identified Howe patent; spring rate of each connector, about $1 \times 10^{-3}$ oz. in./min.

Hysteresis ring 30A: Material, High Nickel Steel; width, about 0.5 in.; maximum thickness (in radial direction), about 1.0 in.

Stator core 34: Outer radius, about 1.375 in.; minimum inner radius (near edges), about 1.1 in.; maximum inner radius (at center recess), about 1.0 in.; width, about 1.0 in.; number of laminations, about 24 of Silicon Iron.

Stator windings: Three windings at 120° to each other; each of No. 36 copper wire, 200 turns per slot.

A.C. supply 40: Frequency and amplitude-regulated; about 400 cycles per second at 24 volts;

Amplitude control 42A: Variably-tapped resistor 92, about 100 ohms; fixed resistor 103 about 500 ohms.

Phase splitter 44A: Capacitor 103 about 10 microfarads.

Current through each winding 98, 99 and 100: About 500 milliamps, plus or minus about 50 milliamps by adjustment of amplitude control 42A.

Rotor speed: About 200 revolutions per second.

Effective spring rate of hysteresis motor: About $2 \times 10^{-4}$ oz. in./min. about each axis at right angles to the spin axis.

Precessional drift rate at effective resonance: Less than about 0.01 °/hr.

While the invention has been described in the interest of complete definiteness in connection with specific embodiments thereof, it will be understood that it may be embodied in a large variety of forms diverse from those specifically described, without departing from the scope of the invention.

What is claimed is:

1. In a rotating-support gyroscope system of the class employing a gyro rotor mounted for rotation on a frame by means of a rotating universal joint, said universal joint comprising intermediate gimbal means on which said rotor is pivotably mounted and which in turn is pivotably mounted on said frame, and means for spinning said rotor and said universal joint whereby said intermediate gimbal means generates an inertial negative spring effect on said rotor, the improvement comprising means for producing and applying to said rotor an electrically-controllable field exerting a positive spring effect between said rotor and said frame to oppose said negative spring effect, said means for producing and applying said electrically-controllable field comprising coil means fixed with respect to said frame and means for passing a controllable current through said coil means to produce a magnetic field exerting a restoring torque on said rotor with respect to said frame.

2. The system of claim 1, comprising a hysteresis ring on said rotor, and in which said coil means comprises hysteresis-motor stator windings cooperating with said hysteresis ring to spin said rotor and to exert said restoring torque thereon.

3. The system of claim 2, in which said means for passing a controllable current through said coil means comprises a source of alternating voltage, amplitude-control means for controlledly varying the amplitude of said voltage, and phase-splitting means for applying said voltage to said windings in different phases to effect said rotor spinning.

4. In a gyroscope system comprising a gyroscope having a rotor, universal joint means for supporting said rotor on a frame, and means for spinning said rotor and said universal joint about a spin axis with respect to said frame, said universal joint comprising intermediate support means, first connecting means supporting said rotor on said intermediate support means, and second connecting means supporting said intermediate means on said frame, said first and second connecting means including spring means exerting a restoring torque on said rotor about axes transverse to said spin axis when the direction of said spin axis deviates from a reference direction with respect to said frame, said spinning of said universal joint means causing said intermediate support means to exert an inertial negative spring effect on said rotor, the improvement in accordance with which said means for spinning said rotor and said universal joint comprises a motor drive winding disposed about said rotor, magnetic means on said rotor cooperating with said winding, means for producing a current through said winding, said winding being responsive to said current to apply to said rotor a torque about said spin axis to produce said spinning and to produce a torque about axes transverse to said spin axis acting additively to said restoring torque in a magnitude increasing with said current, and means for controlledly varying the strength of said current.

5. The system of claim 4, in which said winding comprises a hysteresis motor stator winding and said magnetic means comprises a hysteresis ring on said rotor.

6. In a gyroscope system comprising a frame, a gyro rotor, and universal connecting means supporting said rotor rotatably on said frame for rotation of said rotor about a rotor spin axis variable in direction with respect to said frame, said universal connecting means comprising intermediate support means, first connecting means connecting said rotor to and supporting it on said intermediate support means for rotating said intermediate member with said rotor at the spin rate of said rotor and permitting at least limited pivoting of said intermediate support means with respect to said rotor about a first axis transverse to said spin axis, second connecting means connecting said intermediate support means to and supporting it on said frame and permitting at least limited pivoting of said intermediate support means with respect to said frame about a second axis transverse to said spin axis and to said first axis, said first and second connecting means comprising spring means for providing spring restraint against pivoting of said rotor spin axis away from a reference direction thereof with respect to said frame, the improvement comprising:

motor means for rotating said rotor about said spin axis, said motor means comprising magnet means on said rotor and coil means on said frame responsive to electric current through said coil means to produce rotational torque on said rotor for spinning said rotor about said spin axis, said coil means and said magnet means being positioned to produce negligable torque about axes transverse to said spin axis when said spin axis is along said direction and to produce a spring-like restoring torque on said rotor opposing deviations of spin axis from said direction.

7. The system of claim 6, comprising means for controlledly varying said current to vary the effective spring rate exerted on said rotor by said motor means about said axes transverse to said spin axis.

8. The system of claim 7, in which said coil means comprises a synchronous-motor stator winding and said rotor comprises a hysteresis ring cooperating with said stator winding for spinning said rotor, said winding also acting on said hysteresis ring to produce said spring-like restoring torque.

* * * * *